June 27, 1933.   H. A. WOOFTER   1,915,639
ELECTRIC WELDING APPARATUS
Filed March 17, 1928    5 Sheets-Sheet 1

INVENTOR
Herbert A. Woofter
BY Toulmin and Toulmin
ATTORNEY

June 27, 1933.     H. A. WOOFTER     1,915,639
ELECTRIC WELDING APPARATUS
Filed March 17, 1928     5 Sheets-Sheet 3

INVENTOR
Herbert A. Woofter
BY Toulmin and Toulmin
ATTORNEY

June 27, 1933.   H. A. WOOFTER   1,915,639
ELECTRIC WELDING APPARATUS
Filed March 17, 1928   5 Sheets-Sheet 4

2 PHASE - 4 WIRE SYSTEM

INVENTOR
Herbert A. Woofter
BY
ATTORNEY

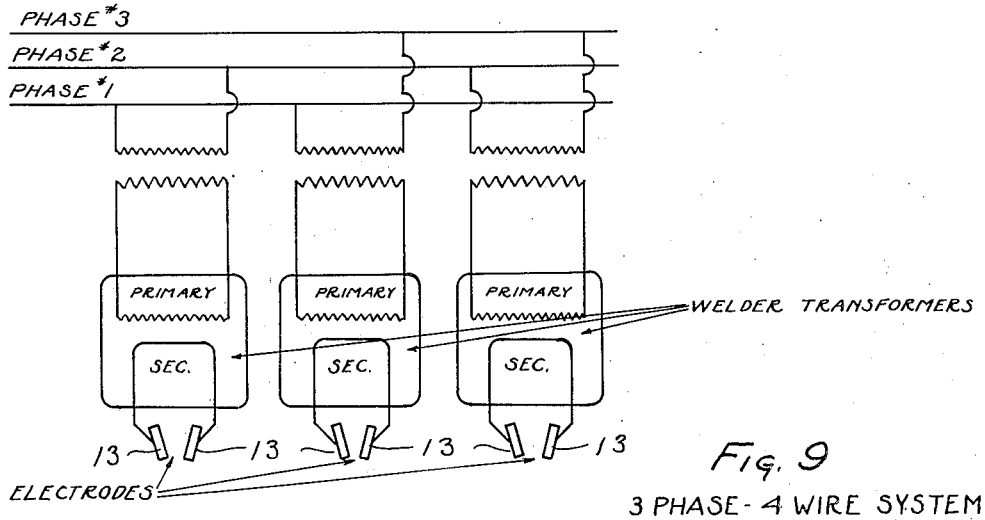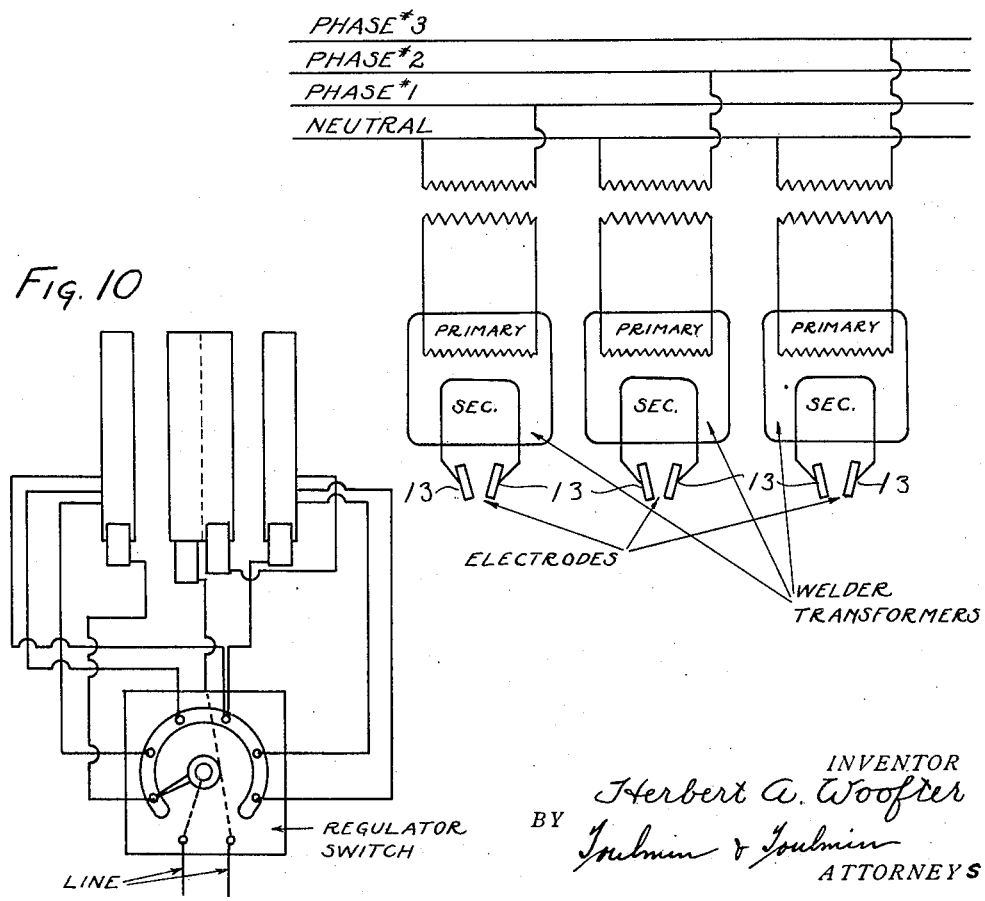

Patented June 27, 1933

1,915,639

UNITED STATES PATENT OFFICE

HERBERT A. WOOFTER, OF DETROIT, MICHIGAN, ASSIGNOR TO SWIFT ELECTRIC WELDER COMPANY, OF DETROIT, MICHIGAN, A CORPORATION OF MICHIGAN

ELECTRIC WELDING APPARATUS

Application filed March 17, 1928. Serial No. 262,420.

My invention relates to an apparatus and method for welding structures and in particular for welding longitudinal seams in hollow structures.

It is the object of my invention to provide an apparatus and method for a continuous welding of longitudinal seams or joints of piping, tubing, angular structures and the like where a continuous process is desirable.

It is a further object to provide a polyphase electric welder for this purpose capable of continuously welding the varying sizes in diameters and lengths of stock up to the maximum limit of the stock available. The exact configuration of the stock employed is not important.

It is one of the principal objects of my invention to electrically weld the pipe or other structure by applying two or more phases of alternating current to the work by means of a plurality of pairs of electrodes and thereby utilize not only the current that flows across the joint of the work between the electrodes of the same phase, but also to utilize the leakage current between the phases which flows along the edges of the joint of the work, thereby preheating the work to increase the time element of heating as the work travels through the welder or the welder travels along the work.

My invention is equally aplicable to work passing through the welder or the welder travelling relative to the work.

It is a further object of my invention to provide for a combination of polyphase preheating and welding with pressure devices adaptable to inequalities in the work and the state of the temperature of the work which force the edges of the work together to push up the weld.

It is my object to provide a mechanism and method which will utilize either a single core or a plurality of cores for either fixed leakage distances or variable distances.

It is my object to secure the advantage of distributing the weld laid over a plurality of phases of the circuit instead of a single phase.

It is an object to provide means for protecting the welding machine from breakage or injury if the power fails or if the switch has been inadvertently left open.

It is the object of my invention to lengthen the time element for heating the work to thereby minimize the distortion of the molecular structure of the work to make it stronger and a more ductile weld.

It is a further object to provide for the heating of the work by preheating, permitting the heat to spread back into the work on each side of the joint or welded seam, thus to prevent a too rapid cooling of the weld with resulting brittleness.

This application is devoted to the electric welding apparatus while a co-pending application filed of even date herewith is devoted to the method of electric welding.

Referring to the drawings:

Figure 8 is a wiring diagram showing the adaptation of a three-phase, three-wire system;

Figure 9 is a wiring diagram showing a three-phase, four-wire system adapted to my invention;

Figure 10 is an internal wiring diagram showing a typical installation of the wiring in connection with my welder, viewed from the top of the coils.

Figure 1:
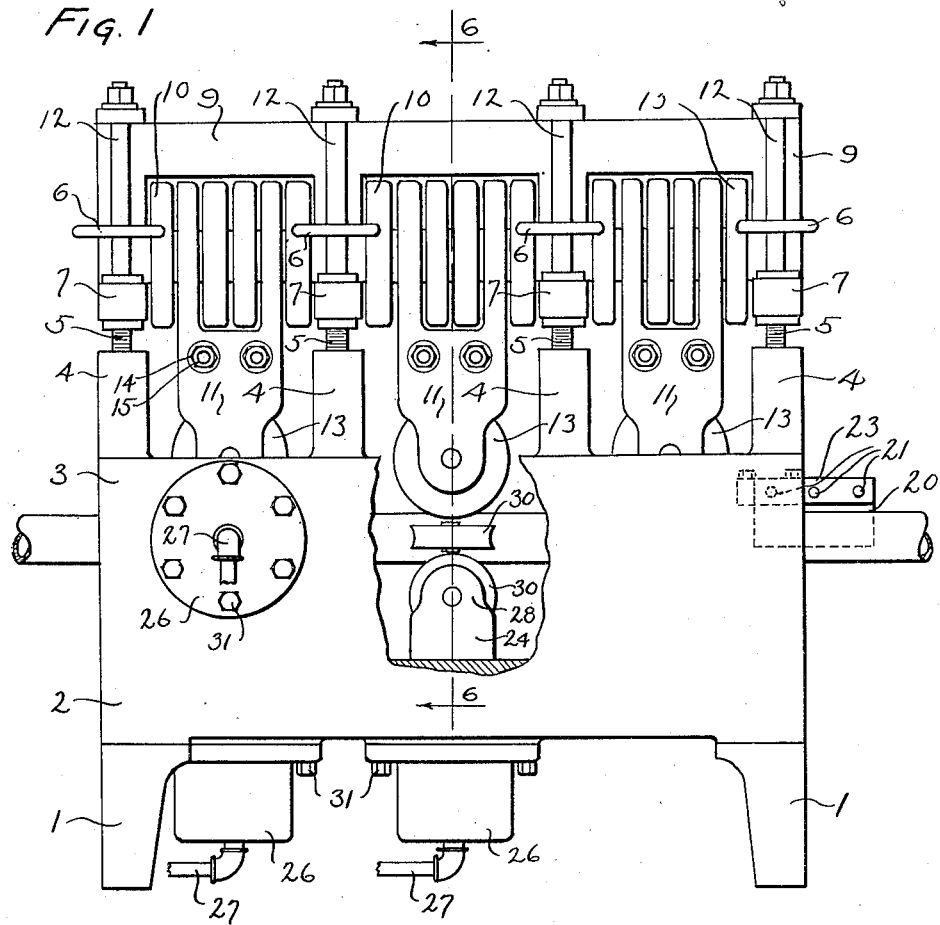
Figure 1 is a side elevation of a machine embodying my invention partially broken away to show the arrangement of the electrodes and pressure devices.

Referring to the drawings in detail, 1 indicates legs supporting a U-shaped frame member consisting of a base 2 and side walls 3. On the side walls is mounted a plurality of spaced, vertical, internally threaded supports 4 adapted to receive the supporting and adjusting screws 5 which are actuated by the handle 6 and turn within the ears 7 of the supporting frame 8 for the electrical mechanism.

Such mechanism consists of a vertically-disposed unitary core 9 adapted to support primary windings 10 and secondary windings 11 of the secondary coils. The bolts 12 serve to retain the core in position on the frame 8.

Electrode mechanism

The secondary coils depend below the core forming a U-shaped structure, the extreme ends of which support the electrodes 13 which may be of any desired form.

For the purpose of illustration, I have shown the wheel type having a periphery with the arcuate section of the structure with which contact is made by the electrodes. These wheel electrodes 13 are journaled upon the free ends of the secondary coils 11. These coils are adjustably positioned with respect to one another by the bolt 14 and nuts 15, the coils being insulated from one another by the insulation 16.

I provide a plurality of these electrodes 13 at spaced intervals progressively in contact with the work being worked upon.

Figure 2:
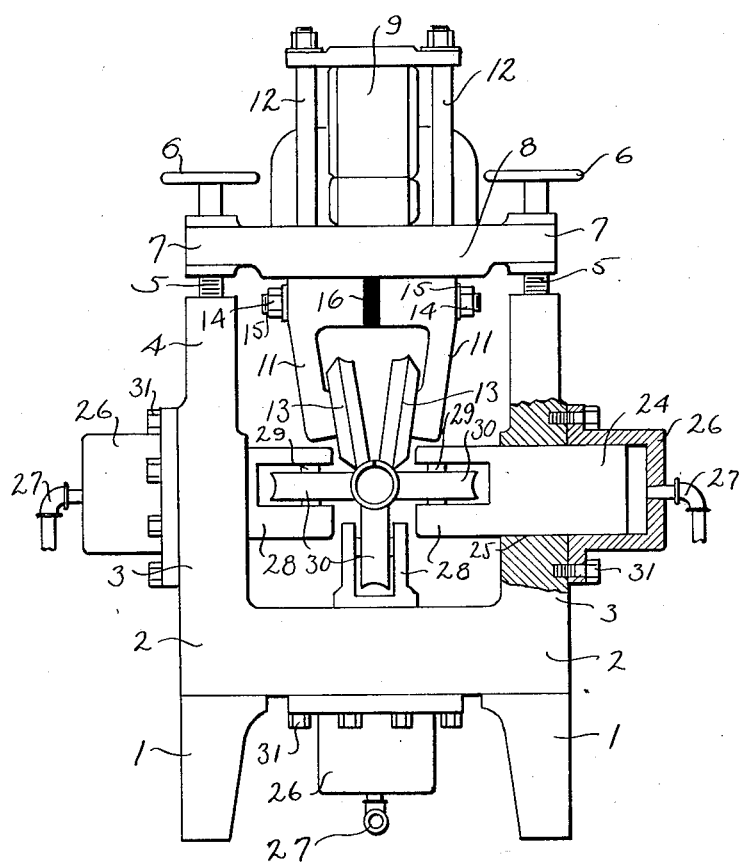
Figure 2 is a left hand end elevation of Figure 1 partially broken away to show one of the pressure devices.
Figure 5:
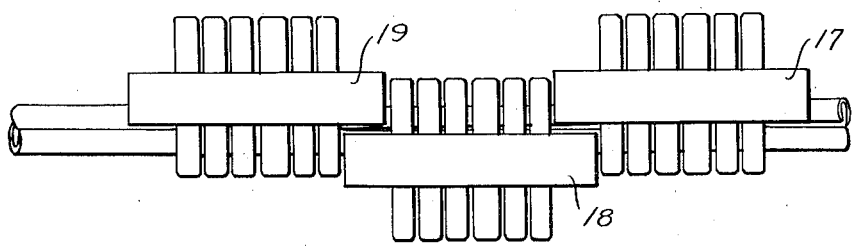
Figure 5 is a diagrammatic plan view of a modified form in which a plurality of cores are used instead of a single core as in the machine illustrated in Figure 1 and Figure 2. This modification is for the purpose of adjustment of the distance between phases to increase the time limit and to vary the resistance of the circuit.
Figure 6:
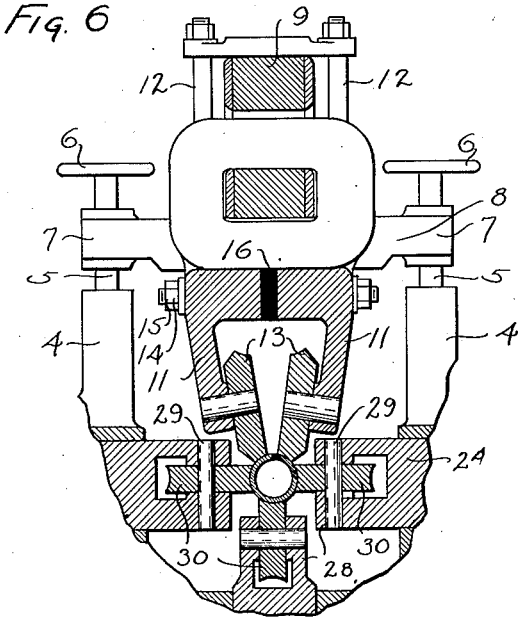
Figure 6 is a section on the line 6—6 of Figure 1.
Figure 7:
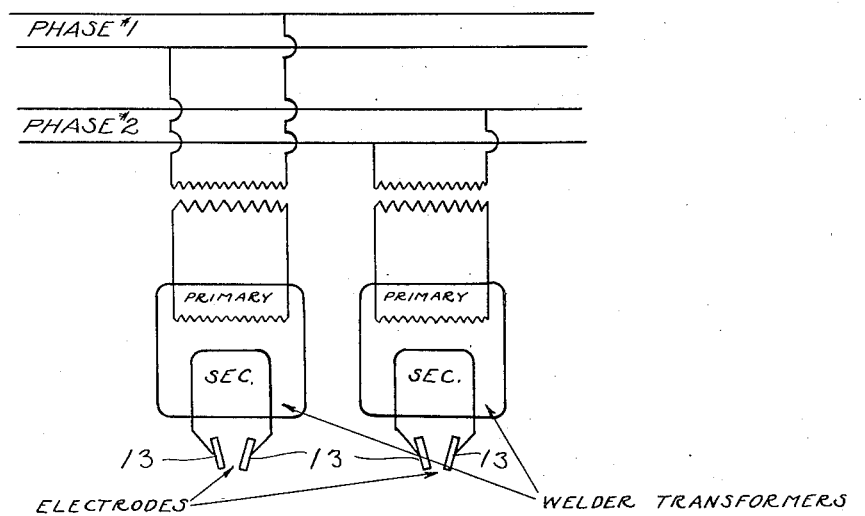
Figure 7 is a wiring diagram showing the two-phase, four-wire system.

The core may be either a single stationary core, such as shown in Figures 1 and 2 or there may be a plurality of cores, such as 17, 18 and 19 in Figure 5, which are relatively movable one to the other.

The object of having these cores movable relative to one another is to provide another method of arranging the transformers to accomplish the desired result so that there may be as many separate cores as there are phases being used. The advantage is that the separate cores permit the phases to move further apart if desired to increase the time limit and to act as the adjustment by varying the length of the path of the current to vary the resistance of the circuit.

Figure 3:
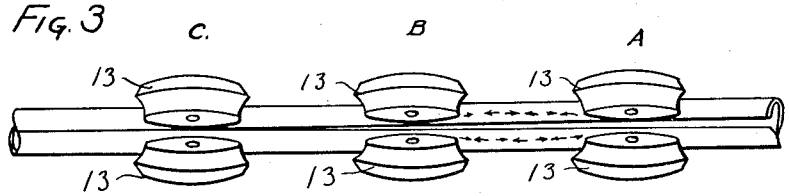
Figure 3 is a diagrammatic plan view of the work and electrodes indicating the flow of current between the first and second pairs of electrodes.
Figure 4:
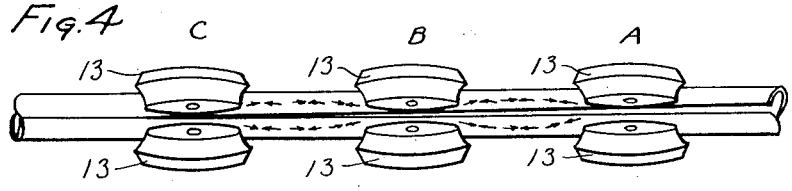
Figure 4 is a top plan view showing the current flowing between the electrodes.

As will be seen in Figures 3 and 4, a current will alternate back and forth between the electrodes of each phase along the edges of the joint in the work, heating the edges to any desired temperature which may be controlled by varying the rate of travel of the work as well as by the use of proper taps in the primary coils in the usual manner. As indicated by the arrows in Figure 1, the current first alternates between group A and group B of electrodes and then between group B and group C while still maintaining the alternation between groups A and B. There is a small exchange of current between phases A and C.

In order to control and prevent the passing of current between the electrodes of group A and the first phase, the gap between the edges of the work must be regulated. This is accomplished by the regulation of the guide 20 whose exact width may be regulated by the bolts 21 operating in the guide supporting members 23. Thus, the amount of current passing from the first phase to the second phase from group A of the electrodes to group B may be regulated or may be entirely eliminated by the adjustment of the pressure on the rollers associated with the electrodes in group B and the electrodes in group C.

Pressure mechanism

Associated with groups B and C of the electrodes are three pressure rollers or other pressure means engaging the sides and bottom of the work or any other portion of the work where proper pressure can be applied to bring the edges together. The pressure means may be of any character but I have shown a hydraulic means consisting of a piston support 24 working in a cylinder formed by an aperture 25 in the side wall 3 of the frame and a detachable cylinder body formed by a cup shaped structure 26 bolted to the side wall 3 by the bolts 31 and having at its base an inlet pipe 27 for the pressure fluid from any suitable source of pressure supply. Of course, any type of pressure mechanism may be utilized for this purpose and the exact details are not important.

This piston member 24 is provided at its free end with jaws 28 having between the jaws an axle 29 on which is mounted the pressure roller 30 having an arcuate face for engaging with the side of the pipe. A similar structure indicated by similar numerals is provided for the engagement with the bottom of the pipe.

Thus, we have the top of the pipe on either side of the joint engaged by the electrodes 13 and the sides and bottom of the pipe engaged by the rollers 30 which are under pressure.

Method of operation

It will be understood that any number of phases of alternating current may be applied to the work by means of a corresponding number of pairs of electrodes, to thus utilize not only the current that flows across the joint of the work between the electrodes of the same phase but also to primarily utilize the leakage current between the phases which flows along the edges to preheat the work thereby increasing the time element of the heating as the work travels through the welder or the welder travels along the work.

It will be further understood that, while I have shown legs 1 for supporting the welder, it is not to be understood that the welder must necessarily be stationary as on certain types of work it may be desirable to maintain the work in a stationary position and to move the welder.

I have shown for illustration only a three-phase welding construction, but my invention is adaptable to any polyphase system.

It is a well known law of electricity that in any two-phase system, the potential between phases is the square root of 2 or 1.43 times the potential between electrodes, and in a three-phase system, the potential between phases is the square root of 3 or 1.73 times the potential between electrodes. Therefore, it will be noted that more potential exists and consequently more current will flow between phases than across electrodes when a suitable path for the flow of current is provided.

My invention is for the purpose of taking advantage of this law to make the work to be welded act as a suitable path for the flow of current between phases and to thereby utilize this leakage or flow to heat the work along the joint prior to the pushing up of the weld by the pressure means.

It is also desirable to provide such pressure means which may be cushioned through hydraulic cylinders or springs so that the inequalities of the work may be accommodated and the cylinder prevented from being broken in case electric power fails during welding or in case it has been forgotten to turn the power on.

In operation, assuming the welder is stationary, the work is forced through the welder by a pressure means, such as a ram, power driven rollers or any other mechanism forcing the work from the right hand to the left hand, as in Figure 1.

Assuming this movement of the work just as the work engages the pressure rollers and the electrodes of group B of phase 2 the switch is closed energizing all the transformers at once. Thereupon, the current begins to alternate back and forth between phase 1 and 2 of electrodes in group A and group B along the edges of the joint in the work heating them to any desired temperature. The variation to the relative speed between the work and the welder as well as the use of proper taps in the primary coils will enable the regulation of the temperature.

As the work travels on it engages the rolls and electrodes of group C of phase 3 and immediately a flow of current alternates backwardly and forwardly between phases 2 and 3 of electrodes in groups B and C.

As the work is squeezed to size between the rollers and the electrodes associated with group C a short circuit occurs so that a part of the current of phase 3 passes through the work directly from electrode to electrode thus giving the final heating and softening of the work and the pressure from the rollers and the electrodes completes the weld.

By adjusting the thickness of the guide 20, it can be insured that no current will pass from electrode to electrode of phase A owing to the gap thus caused at that point between the edges of the work and the amount of current that will pass from electrode to electrode of phase B can be regulated as desired, or even entirely eliminated, by the adjustment of the pressure on rolls associated therewith.

If it is desirable to regulate the time limit and to vary the length of the path of the current to vary the resistance of the circuit, the movable cores can be employed, as shown in Figure 5.

It will be understood that I desire to comprehend within my invention such modifications as may be necessary to adapt it to varying conditions and uses.

Having thus fully described my invention, what I claim as new and desire to secure by Letters Patent, is:—

1. In a welder having work passing relative thereto, means for holding the edges of the work spaced one from the other, means of progressively moving the edges of the work towards each other to final juncture, means of applying a polyphase alternating current to said work at spaced intervals along the edges thereof before final juncture whereby said work is preheated prior to final juncture, said alternating current passing from point to point between phases along the edges thereof.

2. In a welder having work passing relative thereto, means for holding the edges of the work spaced one from the other, means of progressively moving the edges of the work towards each other to final juncture, means of applying a polyphase alternating current to said work at spaced intervals along the edges thereof in the course of final juncture whereby said work is preheated prior to final juncture, said alternating current passing from point to point between phases along the edges thereof, and means of applying one of said phases so that the current between the electrodes thereof will pass across the juncture of the edges.

3. In a welder, means to move the welder and work relative to one another, spaced electrodes arranged in oppositely disposed pairs engaging oppositely disposed spaced and progressively approaching edges of the work, said electrodes of each pair constituting the points of application of a phase of a polyphase current, mechanical means for moving said edges towards one another whereby at the point of juncture the last electrodes of the last phase will carry current across the juncture while the electrodes of the previous phases will carry current along the edges of the juncture.

4. In a welder adapted to have the welder and work pass relative to one another, spaced electrodes arranged in oppositely disposed pairs engaging oppositely disposed spaced and progressively approaching edges of the work, said electrodes of each pair constituting the points of application of a phase of a polyphase current, mechanical means for moving said edges towards one another whereby at the point of juncture the last electrodes of the last phase will carry current across the juncture while the electrodes of the previous phases will carry current along the spaced edges of the juncture, and means for regulating the space between the edges of the work.

5. In a welder adapted to have the welder and work pass relative to one another, spaced electrodes arranged in oppositely disposed pairs engaging oppositely disposed edges of the work, said electrodes of each pair constituting the points of application of a phase of a polyphase current, mechanical means for moving said edges towards one another whereby at the point of juncture the electrodes of the last phase will carry current across the juncture while the electrodes of the previous phases will carry current along the edges of the juncture, means for regulating the space between the edges of the work, and means for yieldingly applying pressure to said work to bring the edges together.

6. In a welding apparatus, a base, work-supporting and feeding means on said base, a core adjustably supported by said base, primary windings and secondary windings on said core, a pair of oppositely disposed spaced contacts on each secondary winding on opposite edges of the work, means to hold the edges of the work in spaced relation as they pass part of the contacts, and means to bring the edges together and apply pressure thereto as the edges reach the last pair of contacts.

7. In a welder, means to support and move the work to be welded, means to hold the edges of the work to be welded in spaced relation to each other, means to apply electric currents of different phases along the spaced edges whereby they are heated, means to bring the heated edges together, and means to apply one of said currents across the contacting edges.

8. In combination, means for supporting the work to be welded and causing it to travel, means to hold the edges of the work to be welded in spaced relation to each other during a portion of its travel, means to apply a polyphase current to each spaced edge of the work whereby it is heated, means to bring the heated edges together, and means to apply a polyphase current across the contacting edges.

9. In combination, means to support the work to be welded and cause it to travel, means to hold the edges of the work to be welded in spaced relation to each other during a portion of its travel, means to bring said edges together, and a polyphase transformer having some electrodes contacting the spaced edges at opposite points and others contacting the edges at the point of contact for applying polyphase currents along the spaced edges of the work as it travels and across the edges at the point of contact.

10. In combination, a supporting frame, means on the frame for supporting and causing the work to travel, means to hold the edges of the work to be welded in spaced relation to each other during a portion of its travel, a transformer frame adjustably mounted on said supporting frame, a polyphase transformer on said transformer frame, said transformer having a plurality of pairs of electrodes contacting with opposite edges of the work, and means to bring the edges of the work together adjacent the points of contact of one pair of electrodes, whereby currents will pass along the spaced edges.

11. In a welder, means to support and move the work to be welded, means to hold the edges of the work to be welded spaced one from the other during a portion of its movement, means for applying electric currents of different phases along each of the spaced edges to heat the edges, and means to bring the heated edges together.

12. In a welder having work passing relative thereto, in combination with a polyphase current system, a transformer for each phase, a pair of electrodes for each phase, each pair of electrodes engaging opposite edges of the work to be welded, and means to first hold the edges of the work engaged by the electrodes spaced from each other and gradually bring them together as the work passes relative to the welder.

13. In a welder having work passing relative thereto, in combination with a polyphase current system, a transformer for each phase, means to hold the edges of the work spaced one from the other during the first portion of the welding operation, means for moving the work and progressively bring the edges toward each other until they contact, and means for applying each phase to the work at spaced intervals from each other phase along the spaced edges as they are brought toward each other, whereby currents will alternate along the edges.

14. In a welder having work passing relative thereto, means for holding the edges of the work spaced one from the other during a portion of the welding operation, means for progressively moving the edges of the work toward each other to final juncture, means for applying a polyphase alternating current to said work at spaced intervals along the spaced edges thereof in the course of final juncture, whereby said work is preheated prior to final juncture, said alternating current passing from point to point between the phases along said edges.

15. In a welder having work passing relative thereto, means operable in the first part of the welding operation for holding the edges of the work spaced one from the other, means for progressively moving the edges of the work toward each other to final juncture, means for applying a polyphase alternating current to said work at spaced intervals along the spaced edges thereof in the course of final juncture, whereby said work is preheated prior to final juncture, said alternating current passing from point to point between the phases along said edges, and means for applying certain of said phases along the spaced edges and others across said edges at their juncture.

16. In a welder having work passing relative thereto, in combination with a polyphase current system, a separate transformer for each phase, a pair of electrodes for each phase, each pair of electrodes engaging opposite edges of the work to be welded, and means to first hold the edges of the work engaged by the electrodes spaced from each other and gradually bringing them together as the work passes relative to the welder.

17. In a welder having work passing relative thereto, in combination with a polyphase current system, a separate transformer having an individual core for each phase, a pair of electrodes for each phase, each pair of electrodes engaging opposite edges of the work to be welded, and means to first hold the edges of the work engaged by the electrodes spaced from each other and then gradually bringing them together as the work passes relative to the welder.

In testimony whereof I affix my signature.

HERBERT A. WOOFTER.